March 21, 1961  G. M. CHAMBERS  2,975,925
CONTAINER ATTACHMENT FOR POP BOTTLES
Filed Jan. 19, 1960
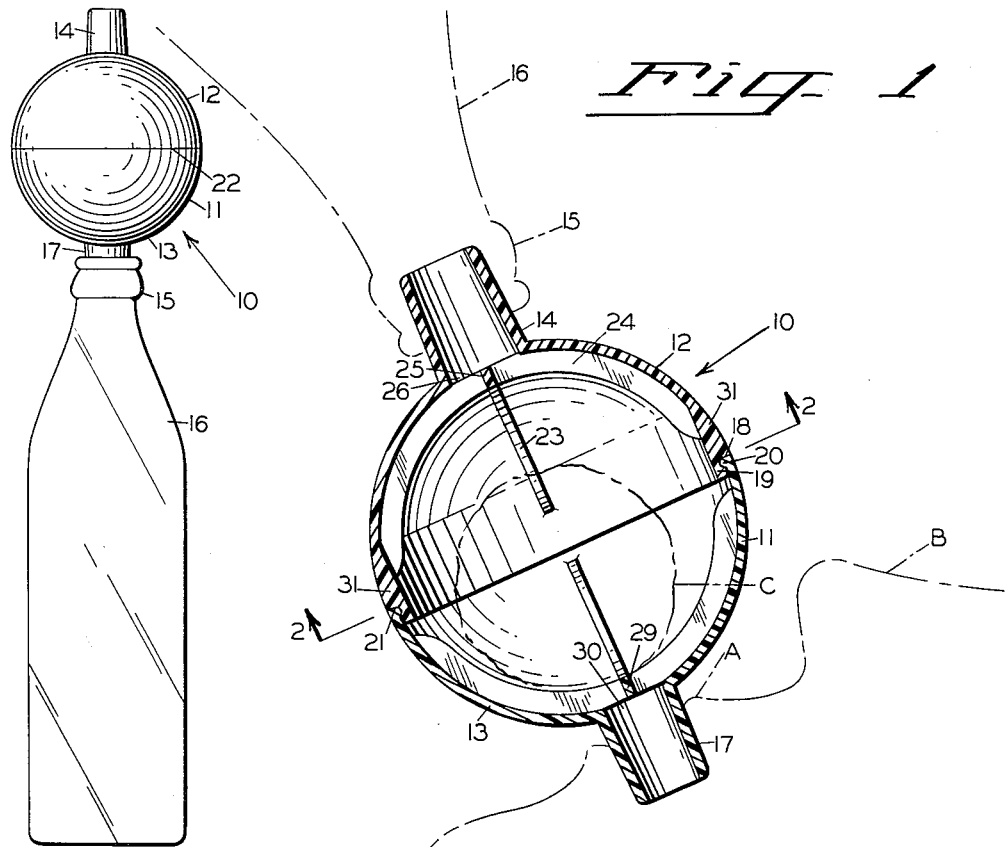
Fig. 1
Fig. 3
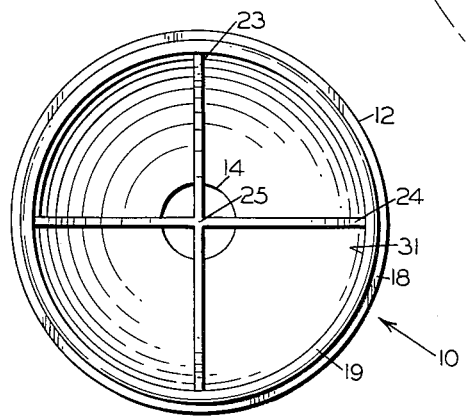
Fig. 2
INVENTOR.
GLENN M. CHAMBERS
BY
Kimmel & Crowell
ATTORNEYS

United States Patent Office 2,975,925
Patented Mar. 21, 1961

2,975,925

CONTAINER ATTACHMENT FOR POP BOTTLES

Glenn M. Chambers, 1035 18th Ave., Longview, Wash.

Filed Jan. 19, 1960, Ser. No. 3,310

1 Claim. (Cl. 215—100)

This invention relates to improvements in containers that are to be attached to pop bottles, and more particularly to a container in which there is to be placed flavoring mixtures and other edible materials so that as the contents of the pop bottle passes through the container, the contents of the pop bottle will be flavored or mixed with the different mixtures or materials in the container.

The invention contemplates the use of a container that may be made of a non-edible material so that the container can be re-used as desired, or made from an edible material that is eaten at the time the contents of the pop bottle is consumed.

An object of the invention therefore is to provide a container that is provided with a drinking neck and a bottle attaching neck so that when the container is attached to a bottle and the bottle is raised in the act of drinking the contents thereof, the contents will pass through the container and be mixed with or flavored by any materials placed in the container.

Another object of the invention, therefore, is to provide a container that may be classified as a confection in that it may be made of an edible material such as material ice cream cones are made from and such material may be refrigerated until used.

With the above and other objects and advantages in view, the invention consists of novel details of construction, arrangement and combination of parts more fully hereinafter described, claimed and illustrated in the accompanying drawing in which:

Figure 1 is a vertical sectional view of a container embodying the invention wherein the container is shown positioned between a pop bottle to which it is connected and a mouth of a person consuming the contents of the pop bottle;

Figure 2 is a transverse sectional view on the line 2—2 of Figure 1; and

Figure 3 is an elevational view on a reduced scale of the container in position in the neck of a pop bottle.

Referring more in detail to the drawing wherein like parts are designated by like reference numerals, the reference numeral 10 is used to generally designate a container embodying the invention. The container 10 may be made of an edible material, such as material from ice cream cones are made, or the container 10 may be made of a non-edible material.

The container 10 assumes the shape of a hollow globe 11 which is made of two semi-globulous sections 12 and 13. The section 12 has a tapered bottle attaching neck 14 which communicates with the interior of the container 10 and the neck 14 is adapted to be inserted into the neck 15 of a pop bottle 16. The section 13 has a somewhat similar drinking neck 17 which also communicates with the interior of the container 10, and the neck 17 is adapted to be received in the mouth A of a person B when in the act of drinking the liquid contents of the pop bottle 16, Figure 1.

The peripheral edge 18 of the section 12 is provided with an inwardly directed annular flange 19 which is adapted to engage a similar inwardly directed annular flange 20 of the section 13 that is provided on the peripheral edge 21 thereof whereby the sections 12 and 13 are retained in fixed relation to each other. The interengagement of the sections 12 and 13 provides a medial demarcation line 22 which forms a separation point for the sections 12 and 13.

Formed integral with the interior of the section 12 are a pair of radially disposed ribs 23 and 24 and the ribs 23 and 24 are in crossed relationship to each other, as at 25, Figure 2. The crossed portions of the ribs 23 and 24 are positioned at the inward end 26 of the neck 14 and the contents of the container 10, such as a scoop of ice cream C, is prevented from blocking or passing through the neck 14.

The section 13 also has a pair of radially disposed ribs 27 and 28 that are formed integral with the interior thereof and the ribs 27 and 28 are in crossed relationship to each other, as at 29. The crossed portions of the ribs 27 and 28 are positioned at the inward end 30 of the neck 17 and the contents of the container 10, such as a scoop of ice cream C, is prevented from blocking the passing through at the neck 17. The ribs 23, 24, 27 and 28 are of crescent shape and extend only a short distance into container 10, thus the interior of the container is not inhibited with the ribs to prevent material from being placed therein.

In order to strengthen the container 10 and to position the flange 19 inwardly of the flange 20, an annular thickened portion or reinforcing rib 31 is formed integral with the interior of the section 12 at the flange 19 and inwardly of the peripheral edge 18 of the section 12.

It is to be understood that the container 10 can be made of an edible or non-edible material and that before the sections 12 and 13 are positioned in fixed relation to each other, ice cream, fizz syrups and other flavoring mixtures may be placed in either of the sections 12 and 13 and the sections will then be connected together. If a liquid mixture is to be used and is to be poured into either the section 12 or 13, the outlet necks 14 and 17 must be closed by finger tip or some other article that will prevent the mixture from leaving the section being filled. After the sections 12 and 13 are connected together, the neck 14 is inserted into the neck 15 of the bottle 16 and the contents of the bottle 16 may be consumed.

The mixture or ice cream placed in the container 10 will, therefore, impregnate the contents of the bottle 16 and provide a soda or similar drank. If the container 10 is made of an edible material it may be eaten at the time the contents of the bottle 16 is consumed or, if a non-edible material, may be separated and cleaned and reused as desired.

There has thus been provided a container that may be filled with any edible material that children like to eat, and whereby the contents of a pop bottle, to which the container is attached, may be impregnated by the material as the contents of the pop bottle is consumed.

We believe, therefore, that the foregoing description of the use to which the container may be placed, as well as the structure thereof, will be clear to those skilled in the art, and it is to be understood that changes in the minor details of construction, arrangement, and combination of parts may be resorted to provided they fall within the spirit of the invention and the scope of the appended claim.

Having thus described the invention what is claimed as new and desired to be secured by Letters Patent is:

A container for a comestible adapted to be attached to a pop bottle comprising a hollow body of globular shape formed of two similar hemispherical sections, each section having at its peripheral edge an inwardly directed annular flange, the engagement of said flanges with each other retaining said sections in fixed relation to each other to form said body, a hollow bottle attaching neck at one pole of said globular body, and a drinking neck at the opposite pole thereof, a pair of radially disposed crescent-shaped ribs interiorly of each section positioned in intersecting diametrically opposed relation to each other, the intersection of each pair being centrally located at the mouth of the associated neck to restrict the passage of the comestible contained in said body through said neck.

References Cited in the file of this patent

UNITED STATES PATENTS

| | | |
|---|---|---|
| 2,527,085 | Snow | Oct. 24, 1950 |
| 2,706,065 | Stone | Apr. 12, 1955 |
| 2,720,332 | Holt | Oct. 11, 1955 |

FOREIGN PATENTS

| | | |
|---|---|---|
| 656,490 | France | Jan. 2, 1929 |